United States Patent [19]

Kamijo

[11] E Patent Number: Re. 33,483

[45] Reissued Date of Patent: Dec. 11, 1990

[54] TAPE RECORDER

[75] Inventor: Masao Kamijo, Tokyo, Japan

[73] Assignees: Tokyo Pigeon Co., Ltd., Tokyo; Kabushiki Kaisha Sankyo Seiki Seisakusho, Nagano, both of Japan

[21] Appl. No.: 345,463

[22] Filed: Apr. 28, 1989

Related U.S. Patent Documents

Reissue of:

[64] Patent No.: 4,720,755
Issued: Jan. 19, 1988
Appl. No.: 803,459
Filed: Dec. 2, 1985

[51] Int. Cl.[5] ..... G11B 15/00; G11B 17/00

[52] U.S. Cl. ..... 360/96.3; 360/105; 242/200

[58] Field of Search ..... 360/96.3, 96.4, 96.5, 360/105, 137; 242/197–201

[56] References Cited

U.S. PATENT DOCUMENTS

| | | | |
|---|---|---|---|
| 4,167,764 | 9/1979 | Hanajima et al. . | |
| 4,225,894 | 9/1980 | Fulukawa | 360/96.3 X |
| 4,497,001 | 1/1985 | Hayashi et al. . | |
| 4,523,241 | 6/1985 | Ito | 360/96.4 X |
| 4,547,823 | 10/1985 | Ri | 360/105 X |
| 4,572,013 | 2/1986 | Kasukave . | |
| 4,614,987 | 9/1986 | Sukenari | 360/93 |
| 4,656,552 | 4/1987 | Takahashi et al. . | |
| 4,674,001 | 6/1987 | Takahashi et al. . | |
| 4,691,261 | 9/1987 | Hasegawa et al. . | |

*Primary Examiner*—A. J. Heinz
*Attorney, Agent, or Firm*—Flynn, Thiel, Boutell & Tanis

[57] ABSTRACT

A tape recorder includes a single solenoid selectively switched between a long time energization and a short time energization; a trigger arm activated by the solenoid; an assist gear having a non-toothed portion and controlled in angular position by the trigger arm; and a head plate controlled in position by the assist gear. The assist gear has control members to fix the head plate at a stop position, recording/reproducing position or intermediate position between them in response to selective energization of the solenoid for the long time or the short time.

28 Claims, 6 Drawing Sheets

TAPE RECORDER

Matter enclosed in heavy brackets [ ] appears in the original patent but forms no part of this reissue specification; matter printed in italics indicates the additions made by reissue.

FIELD OF THE INVENTION

This invention relates to a tape recorder, and more particularly to a tape recorder using a single solenoid to select any desired mode of the tape player.

BACKGROUND OF THE INVENTION

Tape recorders in general are selectively operative in three tape feeding modes, i. e. the recording/reproducing mode, fast-forwarding mode and rewinding mode. Some tape players utilize electromagnetic energy of solenoids to significantly reduce the manual force applied to a selected button or lever to change from one mode to another.

Such a prior art tape recorder includes a plurality of solenoids such as a head plate control solenoid and a tape drive system control solenoid which are activated independently or simultaneously, depending on a selected mode.

The use of a plurality of solenoids invites an increased size and an increased manufacturing cost of a tape player.

OBJECT OF THE INVENTION

It is therefore an object of the invention to provide a tape recorder having a single solenoid which can be selectively switched for a long time energization or a short time energization, so as to reduce the weight, dimension and manufacturing cost of the tape player.

SUMMARY OF THE INVENTION

In accordance with the present invention, there is provided a tape recorder comprising:

a single solenoid which can be selectively switched between a long time energization and a short time energization;

a trigger arm activated by said solenoid;

an assist gear including at least one non-toothed portion and first, second and third control portions, said assist gear being controlled in rotation by selective engagement of said trigger arm with said first, second and third control portions;

a head plate controlled in position by said assist gear;

a selection plate slidably mounted on said head plate and activated by said solenoid; and a drive gear controllably engaging said selection plate and assist gear to transmit the rotation of a tape supply reel in the rewinding mode and to a tape take-up reel in the fast-forwarding mode of the recorder;

said head plate being configured to take a stop position when said trigger arm engages said first control portion, take a recording/reproducing position when said trigger arm is released from said first control portion and subsequently engages said third control portion, and take an intermediate position between said stop and recording/reproducing positions when said trigger arm engages said second control portion in said fast-forwarding mode.

When one of the two different energizing durations of the solenoid is selected, the trigger arm responsively controls the angular position of the assist gear which in turn responsively fixes the head plate at the stop position, recording/reproducing position or intermediate position, thereby establishing a desired mode.

The invention will be better understood from the description given below, referring to preferred embodiments illustrated in the drawings.

DETAILED DESCRIPTION

Figure 1:
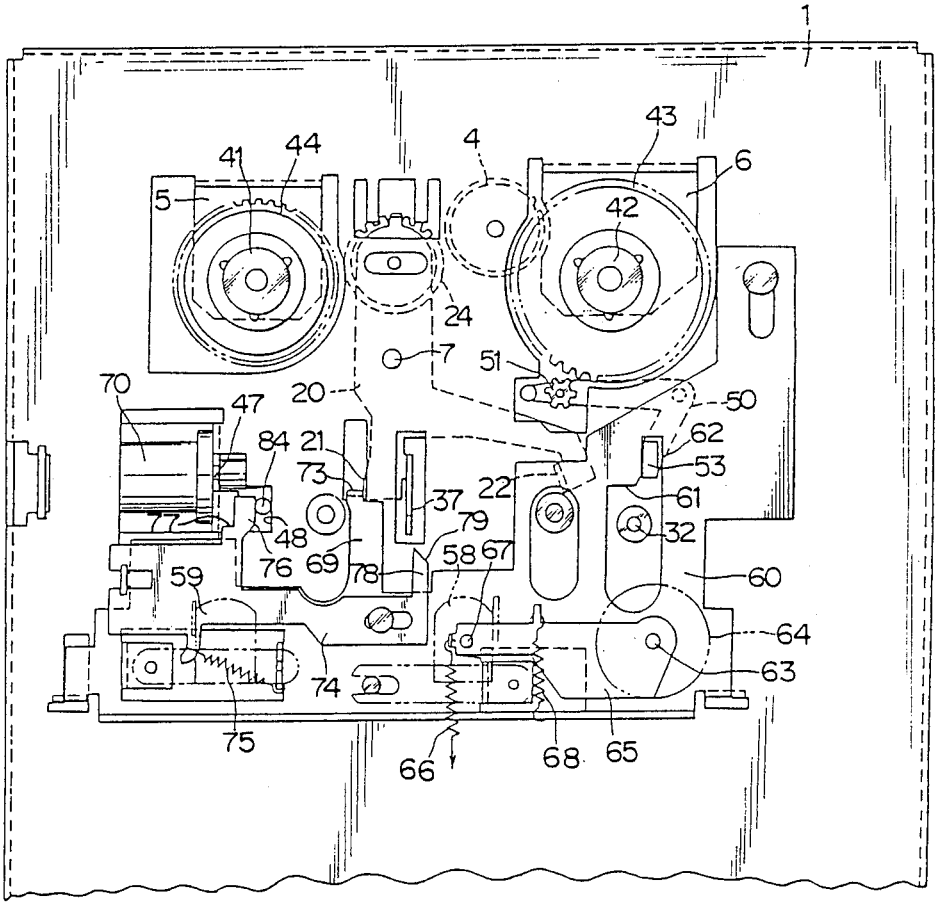
FIG. 1 is a plan view of a tape recorder embodying the invention.
Figure 2:
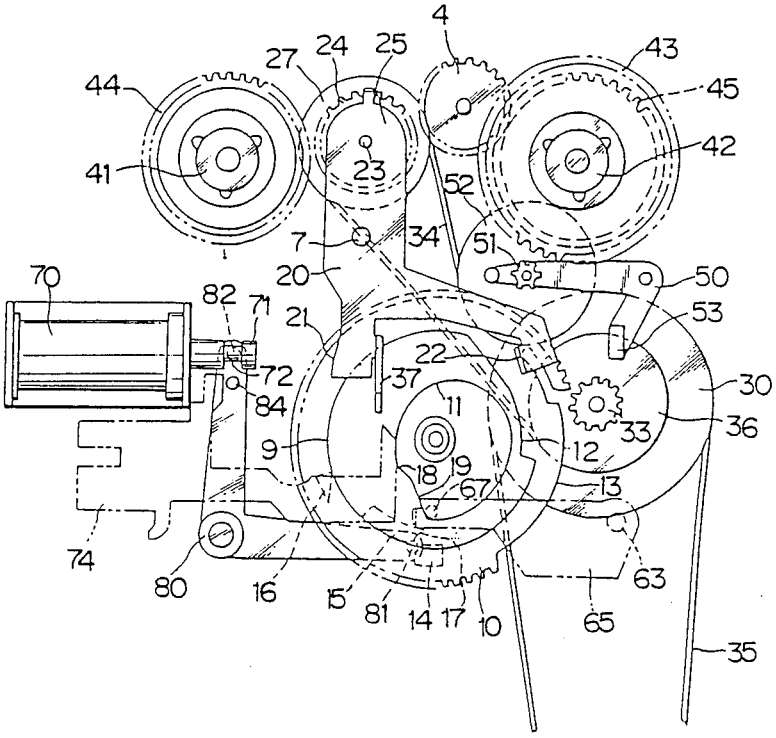
FIG. 2 is a plan view of an arrangement under a base plate of the tape recorder of FIG. 1.

Referring to FIGS. 1 through 4, a base plate 1 of a tape recorder has a pair of tongue-shaped members 5–6 which are downwardly offset from a major planar surface thereof. Reel shafts 2–3 are secured to the tongue-shaped members 5–6 and rotatably support a tape supply reel base 41 and a tape take-up reel base 42. The reel base 41 has a gear 44 integrally formed therewith, and the reel base 42 has a large gear 43 rotatably supported thereon via a friction mechanism and has a small gear 45 integrally formed therewith. The gear 45 always engages a gear 4 rotatably mounted on the base plate 1. A flywheel 30 is rotatably supported on the base plate 1 by a capstan shaft 32 which is unitary with the flywheel 30 and projects through and above the base plate 1. The flywheel 30 has an annular groove 31 engaging a belt 35 via which the flywheel 30 is rotated by a drive motor not shown. The flywheel 30 has a small gear 33 and a pulley 36 both formed integrally therewith. The pulley 36 engages a reel base drive belt 34.

Under the base plate 1 is provided a drive arm assembly 20 which is supported by a shaft 7 for rotation in a plane parallel to the base plate 1. The drive arm assembly 20 has a first arm 25 to which a downwardly projecting shaft 23 is secured. The shaft 23 coaxially supports a drive gear 24, belt 26 used as a friction member, pulley 27, coil spring 28 and stopper 29 in sequence. The spring 28 has sufficient energy to produce between the gear 24 and pulley 27 a friction large enough to transmit rotation from the pulley 27 to the gear 24. The drive arm assembly 20 has a second arm which includes a cam portion 21 diagonally, coplanarly extending along one side edge thereof and an upward vertical portion 37 vertically standing along the other side edge thereof.

The upward vertical portion 37 projects above the base plate 1 through a window of the base plate 1 and extends toward a head plate 60 which will be described later. The drive arm assembly 20 has a third arm 38 which includes a downward vertical portion 22 vertically, downwardly projecting from the distal end of the third arm 38.

Under the base plate 1 and between the flywheel 30 and take-up reel base 42 is provided a bell-crank-shaped play arm assembly 50 which is supported rotation in a plane parallel to the base plate 1. The play arm assembly 50 has a first arm which rotatably supports on an upper surface of the distal end thereof a play gear 51 having a small diameter. The play gear 51 is located close to the outer circumference of the gear 43 of the reel base 42. Under the first arm of the play arm assembly 50 is provided a play pulley 52 coaxially with the play gear 51. The play arm assembly 50 has a second arm which includes at the distal end thereof an upward projection 53 having a rectangular cross section. The projection 53 passes through a relief hole formed in the base plate 1 and enters in a narrow slit 62 formed in the head plate 60 and communicating with a relief hole for the capstan shaft 32. When the play arm assembly 50 rotates clockwise in the drawings, the play gear 51 is engageable with the gear 43 of the reel base 42. However, while the projection 53 of the play arm assembly 50 engages the narrow slit 62 of the head plate 60 as shown in FIG. 1, the play gear 51 is isolated from the gear 43. The pulley 27 is connected to the pulley 36 of the flywheel 30 by the belt 34, and the play pulley 52 compressingly engages the belt 34 between the pulleys 27 and 36. Therefore, when the flywheel 30 is rotated via the belt 35, the play pulley 52 is also rotated. Additionally, since the play pulley 52 is compressed by the tensile force of the belt 34, the play arm assembly 50 is biased clockwise in FIG. 2. Nevertheless, the play arm assembly 50 is normally prevented from rotating clockwise because the projection 53 engages the narrow slit 62 of the head plate 60.

Figure 3:
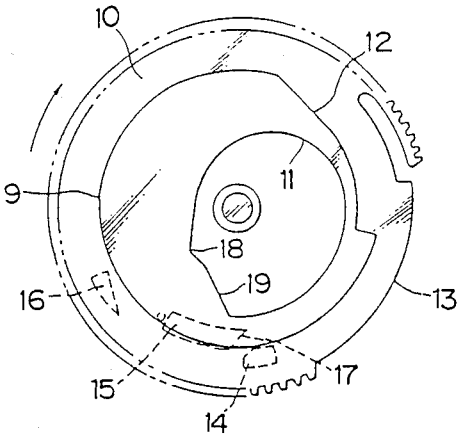
FIG. 3 is a fragmentary plan view of an assist gear shown in FIG. 2.
Figure 4:
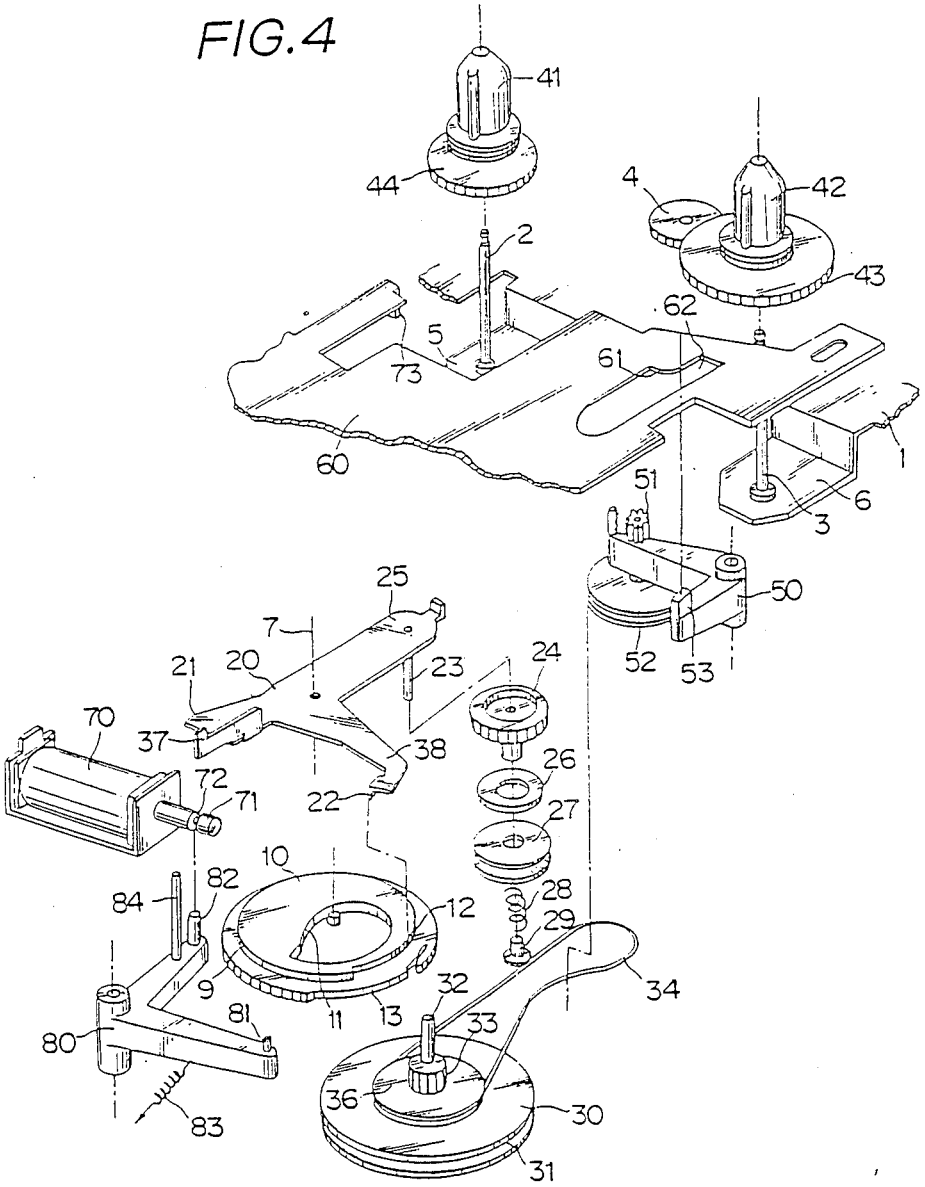
FIG. 4 is a perspective view of some disassembled members included in the arrangement of FIG. 2.

Under the base plate 1 is rotatably provided an assist gear 10. A driving gear 33 integrally formed on the flywheel 30 is located close to the outer circumference of the assist gear 10. The assist gear 10 has a non-toothed portion 13 as best shown in FIG. 3. The upper surface of the assist gear 10 has an up-step portion which is higher than the remainder of the upper surface. The up-step portion defines an outer circumference 9 and an inner cam contour 11. The outer circumference 9 includes an outer cam contour 12 which confronts the downward vertical cam follower portion 22 and gradually approaches the rotation axis of the assist gear 10. The inner cam contour 11 defines an oval which is eccentric with respect to the rotation axis of the assist gear 10 and is chipped at one end thereof defined by a substantially straight edge 19. The straight edge 19 extends between a small-radius portion and a large-radius portion of the oval, and defines a moderate valley 18 at the junction with the small-radius portion. The assist gear 10 has three projections 14–15–16 projecting downward from the bottom surface thereof. The projections 14 and 16 are located along the circumference of a common circle coaxial with the assist gear 10, and the projection 15 is located radially inward of the projections 14 and 16. The assist gear 10 is rotated clockwise by the gear 33 as will be described later. The rear end 17 of the projection 15 with respect to the clockwise rotation is beveled so that the radially inner edge thereof is rearwardly longer than the outer edge thereof.

Under the base plate 1 is mounted a solenoid 70 having a plunger 71. The plunger 71 has an annular groove 72 near the distal end thereof. The annular groove 72 engages a pin 82 provided at one end of one arm of a bell-crank-shaped trigger arm assembly 80. Another pin 84 which is longer than the pin 82 is provided near the pin 82 and projects above the base plate 1. The other arm of the trigger arm assembly 80 has a pin 81 formed at one end integrally therewith. The trigger arm assembly 80 is biased clockwise by a spring 83, but is prevented from rotating while the pin 48 engages a margin 84 of a relief hole of the base plate 1. When the solenoid 70 is energized and attracts the plunger 71, the trigger arm assembly 80 is rotated counterclockwise and brings the pin 81 radially inward of the projections 14 and 16 of the assist gear 10. When the solenoid 70 is de-energized, the trigger arm assembly 80 is rotated clockwise by the resiliency of the spring 83 to bring the pin 81 ahead and locate it in the path of the projections 14 and 16. The solenoid 70 is selectively switched in response to a selected operating mode of the recorder between a short time energization and a long time energization.

1 Above the base plate 1 is provided the head plate 60 which is supported by a guide means for movement slidably up and down in FIG. 1. The right end of the head plate 60 in FIG. 1 has a pinch roller shaft 63 secured thereto. The pinch roller shaft 63 supports a bias lever 65 pivotably in a plane parallel to the head plate 60 and also supports a pinch roller 64 pivotably. The bias lever 65 has a cam follower pin 67 at a free end thereof and is biased by a spring 66 counterclockwise in FIG. 1 for an amount of rotation limited by engagement between the pin 67 and the inner cam contour 11 of the assist gear 10. The bias lever 65 and the head plate 60 are connected by a spring 68 so that they move together for a distance when the bias lever 65 is moved. The relief hole for the capstan shaft 32 and the narrow slit 62 define a step 61 between them. The head plate 60, supports a recording/reproducing head 58 and an erasing head 59 which are secured thereto by an appropriate means. The head plate 60 has a downward projection 69 projecting toward the drive arm 20 and having at the distal end thereof a bent portion 73. The bent portion 73 extends through and under the base plate 1 and normally engages the cam portion 21 of the drive arm 20 to locate same at a neutral position. On the left hand side of the head plate 60 in FIG. 1 is mounted a selection plate 74 which is supported by an appropriate guide means for movement slidably in right and left directions. The selection plate 74 is biased by a spring 75 to the right in the drawing up to a position where a projection 76 of the selection plate 74 abuts the pin 84 of the trigger arm 80. A step 77 is defined along the left margin of the projection 76. When the selection plate 74 is maintained at a left hand position against the energy of the spring 75 and when the selection plate 74 is moved upward in FIG. 1 together with the head plate 60, the step 77 abuts a projection 47 formed on the base plate 1 to terminate the movements of the selection plate 74 and the head plate 60. The selection plate 74 has a projection 78 which extends from one end of the selection plate 74 toward the upward vertical portion 37 of the drive arm 20. The distal end of the projection 78 is beveled to define a slope 79. The projection 78 is normally located on the right side in FIG. 1 of an imaginary extension of the upward vertical portion 37 of the drive arm 20.

However, when the projection 78 is moved leftward via the pin 84 of the trigger arm 80 in response to energization of the solenoid 70, the slope 79 of the projection 78 confronts the upward vertical portion 37 of the drive arm 20, and pushes same to the right when the selection plate 74 moves forward (upward in FIG. 1) together with the head plate 60.

The embodiment described above operates as follows in or between different modes of the recorder.

Initial Aspect

The head plate 60 is located at a retreat or withdrawal position (lower position in FIG. 1) together with the bias lever 65 pivotably biased by the spring 66. The pin 67 of the bias lever 65 is located at a corner defined by the large-radius portion and the straight edge 19 of the inner cam contour 11 of the assist gear 10 so as to maintain the assist gear 10 at a predetermined angular position and maintain the gear 33 of the flywheel 30 at a position slightly spaced from the non-toothed portion 13 of the assist gear 10. The solenoid 70 is off, and the trigger arm 80 is maintained by the spring 83 at a position where the pin 84 engages the margin 48 of the relief hole of the base plate 1 and where the pin 81 abuts the projection 14 of the assist gear 10. The bent portion 73 of the head plate 60 abuts the cam portion 21 of the drive arm 20 and maintains the drive arm 20 at the neutral position. The drive gear 24 is located at a neutral position disengaged from the gear 44 of the supply reel base 41 and from the gear 4. The downward vertical portion 22 of the drive arm 20 is located apart from the outer cam contour 12 of the assist gear 10. The projection 53 of the play arm assembly 50 is located in the narrow slit 62 of the base plate 1, and the play gear 51 is spaced from the gear 43 of the take-up reel base 42.

Recording and Reproduction

After or upon energization of a drive motor which is not shown, the solenoid 70 is activated for the short time interval. Due to this, the plunger 71 is attracted and moved, so that the trigger arm assembly 80 is rotated counterclockwise via the pin 82 against the biasing force, and the pin 81 pushes the rear end 17 of the projection 15 of the assist gear 10 to slightly rotate the gear 10 clockwise into engagement with the gear 33. After this, the assist gear 10 is rotated clockwise by the gear 33. The solenoid 70 is soon de-energized and allows the trigger arm 80 to return to its original position where the pin 81 is located in the path of the projection 16 of the assist gear 10. As the assist gear 10 is rotated, the pin 67 of the bias lever 65 gradually changes its position on the inner cam contour 11 from a large-radius portion to a smaller-radius portion and is this moved upward in FIG. 2. Since the bias lever 65 having the pin 67 is now united to the head plate by the spring 68, the bias lever 65 and the head plate 60 move together responsively to the movement of the pin 67. Since the trigger arm assembly 80 and the selection plate 74 have returned to their original positions due to de-energization of the solenoid 70, when the selection plate 74 moves ahead together with the head plate 60, the projection 78 of the selection plate 74 moves to the right hand side of the drive arm 20. Clockwise rotation of the drive arm 20 is limited by the downward vertical portion 22 thereof which slidably engages a uniform radius portion of the outer circumference 9 of the up-step portion of the assist gear 10 which is now rotating. Therefore, the drive arm 20 remains at the neutral position where the gear 24 thereof does not engage the gear 44 nor gear 4. As the head plate 60 moves, the projection 53 of the play arm 50 changes its position from the narrow slit 62 to the step 61, and the play arm 50 is allowed to rotate clockwise with the tensile force of the belt 34 to bring the play gear 51 into engagement with the gear 43. Since the play gear 51 has already resumed rotation via the flywheel 30, pulley 36, belt 34 and play pulley 52, the gear 43 and the reel base 42 are rotated by the play gear 51, and a tape not shown is rolled up by the take-up reel. Concurrently, the pinch roller 64 supported by the pinch roller shaft 63 of the head plate 60 compresses the tape onto the capstan shaft 32, so that the tape is transported at a constant speed, slidably contacting the magnetic heads 58–59. Thus the recording and reproduction mode is established.

The assist gear 10 rotates until the projection 16 engages the pin 81 of the trigger arm 80. While the projection 16 engages the pin 81, the gear 33 is opposed to the non-toothed portion 13 and does not drive the assist gear 10. At that time, the pin 67 of the bias lever 65 enters in the valley 18 of the inner cam contour 11 of the assist gear 10 and slightly retreats from its forward limit position. However, since the forward movement amount of the bias lever 65 is slightly larger than that of the head plate 60, the pinch roller 64 is compressed to the capstan shaft 32 by an appropriate pressure, and the difference between the movement amounts is resiliently absorbed by the spring 68. In these positional relationships of the recording and reproduction mode, due to return forces exerted on the bias lever 65 and head plate 60 by the spring 66, the pin 67 pushes the valley 18 and straight edge 19 of the inner cam contour 11 and biases the gear 10 clockwise in FIG. 2.

Fast-forwarding

In a change from the recording/reproduction mode to the fast-forwarding mode, the solenoid 70 is activated in the positional relationships of the recording/reproduction mode just for a time which the tape should be speedily driven for. When the solenoid 70 is activated, the trigger arm 80 is rotated clockwise, bringing the pin 81 from the path of the projection 16 toward the rotation axis of the assist gear 10. Since the pin 67 biased by the spring 66 compresses the valley 18 and straight edge 19 of the inner cam contour 11, the assist gear 10 is rotated clockwise. The rotation, however, is limited by the pin 81 of the trigger arm 80 which engages the projection 15. The limited rotation of the assist gear 10 causes the head plate 60 to withdraw by a distance to an intermediate position where the pinch roller 62 is somewhat spaced from the capstan shaft 32 and where the gear does not yet engage the assist gear 10. The downward vertical portion 22 of the drive arm 20 is opposed to the outer cam contour 12 of the assist gear 10, and the drive arm 20 is rotatable clockwise. Thus the drive arm 20 rotates clockwise with the tensile force of the belt 34, and the drive gear 24 engages the gear 4. Rotation of the drive gear 24 effected by the belt 34 and pulley 27 is transmitted to the reel base 42 via the gears 4 and 45 and drives the reel base 42 at a higher speed. Thus the fast-forwarding mode is established.

This mode may also be used as a cue mode by concurrently detecting a signal by the magnetic head 58.

Rewinding

In selection of the rewinding mode, the solenoid 70 is activated for a long time interval in positional relationships in the aforegoing initial aspect. The long-time activation of the solenoid 70 rotates the trigger arm 80 to cause the pin 81 to push the rear end 17 of the projection 15 of the assist gear 10 so that the assist gear is slightly rotated into engagement with the gear 33. Subsequently, the assist gear 10 is rotated by the gear 33, and the head plate 60 carries out forward movement. Since the solenoid 70 is continuously activated, the selection plate 74 is moved to and maintained at a leftward position by the pin 84. After the slope 79 of the projection 78 of the selection plate 74 reaches a position opposed to the upward vertical portion 37 of the drive arm 20 and when the selection plate 74 moves together with the head plate 60, the slope 79 pushes the upward vertical portion 37 and rotates the drive arm 20 counterclockwise to bring the drive gear 24 into engagement with the gear 44. The supply reel base 41 is rotated at a high speed by the gears 24 and 44 and rolls back the tape thereon. In the forward movement of the head plate 60, the step 77 of the selection plate 74 abuts the projection 47. Therefore, the head plate 60 stops at an intermediate position slightly behind its play mode position and is prevented from moving ahead further. This effectively eliminates a fault that the head plate 60 reaches the play mode position before the rewinding mode is established. Rotation of the assist gear 10 is stopped by the pin 81 of the trigger arm 80 which engages the projection 15 of the assist gear 10. The gear 33 is opposed to the non-toothed portion 13 and never engages the assist gear 10.

The rewinding mode may also be established by initially energizing the solenoid for the long time interval and de-energizing thereafter so that the step 77 engages the projection 47 and stops the head plate 60 at the intermediate position.

The rewinding mode may also be used as a review mode by detecting a signal by the head 58.

Stop

In a change from the fast-forwarding or rewinding mode to the stop mode, the solenoid 70 is activated for the long time interval. In the fast-forwarding or rewinding mode, the pin 67 of the bias lever 65 is located along the straight edge 19 of the inner cam contour 11 of the assist gear 10, and is biased by the spring 66 in its withdrawal direction. Therefore, the assist gear 10 is biased clockwise. However, when the pin 81 of the trigger arm 80 disengages from the projection 15 of the assist gear 10 due to de-energization of the solenoid 70, the assist gear 10 is allowed to rotate clockwise and returns to its initial position of FIG. 2 together with other members. Thus the fast-fowarding or rewinding mode is terminated.

In a change from the recording/reproduction mode to the stop mode, the motor is first stopped, and the solenoid is subsequently activated for the short time interval, so that the tape never overruns before the stop mode is established.

FIGS. 5 through 10 show a further embodiment of the invention in which the solenoid controls not only a trigger arm but also a control arm which engages a drive arm. In FIGS. 5 through 10, a base plate 101 has a pair of tongue-shaped members 101a–101b which are downwardly offset from a major planar surface thereof. Reel shafts 110–111 are secured to the tongue-shaped members 101a–101b and rotatably support a tape supply reel base 112 and a tape take-up reel base 113. The supply test base 112 has a gear 114 formed integrally therewith, and the take-up reel base 113 has a small gear 115 formed integrally therewith and a large gear 116 supported under the small gear 115 via a friction mechanism. The gear 115 always engages a gear 117 rotatably mounted on the base plate 101. A flywheel 102 is rotatably supported on the base plate 101 by a capstan shaft 118 which is unitary with the flywheel 102 and projects through and above the base plate 101. The flywheel 102 has an annular groove engaging a belt 119 via which the flywheel 102 is rotated by a drive motor 120. The flywheel 102 has a small gear 102a and a pulley 102b both formed integrally therewith. The pulley 102b engages a reel base drive belt 121.

Under the base plate 101 is provided a drive arm assembly 103 which is supported by a shaft 122 for rotation in a plane parallel to the base plate 101. The drive arm assembly 103 has a first arm to which a downwardly projecting shaft 123 is secured. The shaft 123 coaxially supports a drive gear 124, felt used as a friction member and pulley 125 which are compressed upward by a coil spring so that a friction force is produced between the gear 124 and pulley 135 to transmit rotation from the pulley 125 to the gear 124. The drive arm assembly 103 has a second arm which includes a cam portion 103a diagonally, coplanarly extending along one side edge thereof and an upward vertical portion 103b vertically standing along the other side edge thereof. The upward vertical portion 103b projects above the base plate 101 through a window of the base plate 101 and extends toward a head plate 104 which will be described later. The drive arm assembly 103 has a third arm 103c which includes a downward vertical portion 103d vertically, downwardly projecting from the distal end of the third arm 103c. The drive arm assembly 103 has a fourth arm which includes an upward vertical portion 103e vertically, upwardly standing from the distal end thereof.

Under the base plate 101 and between the flywheel 102 and take-up reel base 113 is provided a bell-crank-shaped play arm assembly 105 which is supported rotatably in a plane parallel to the base plate 101. The play arm assembly 105 has a first arm which rotatably supports on an upper surface of the distal end thereof a play gear 126 having a small diameter. The play gear 126 is located close to the outer circumference of the gear 116. Under the first arm of the play arm assembly 105 is provided a play pulley 127 coaxially with the play gear 126. The play arm assembly 105 has a second arm which includes at the distal end thereof an upward projection 105a having a rectangular cross section. The projection 105a passes through a relief hole formed in the base plate 101 and is opposed to and engageable with a control portion 104a formed on the head plate 104.

Figure 5:
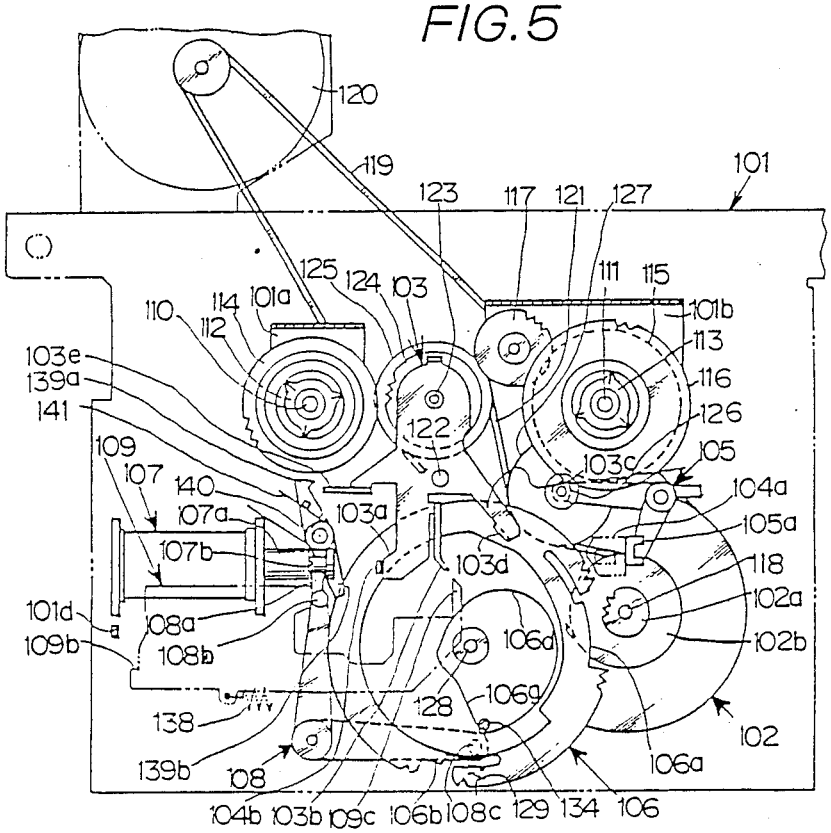
FIG. 5 is a plan view of an arrangement under a base plate of another tape recorder in the stop mode, which tape recorder is a further embodiment of the invention.
Figure 6:
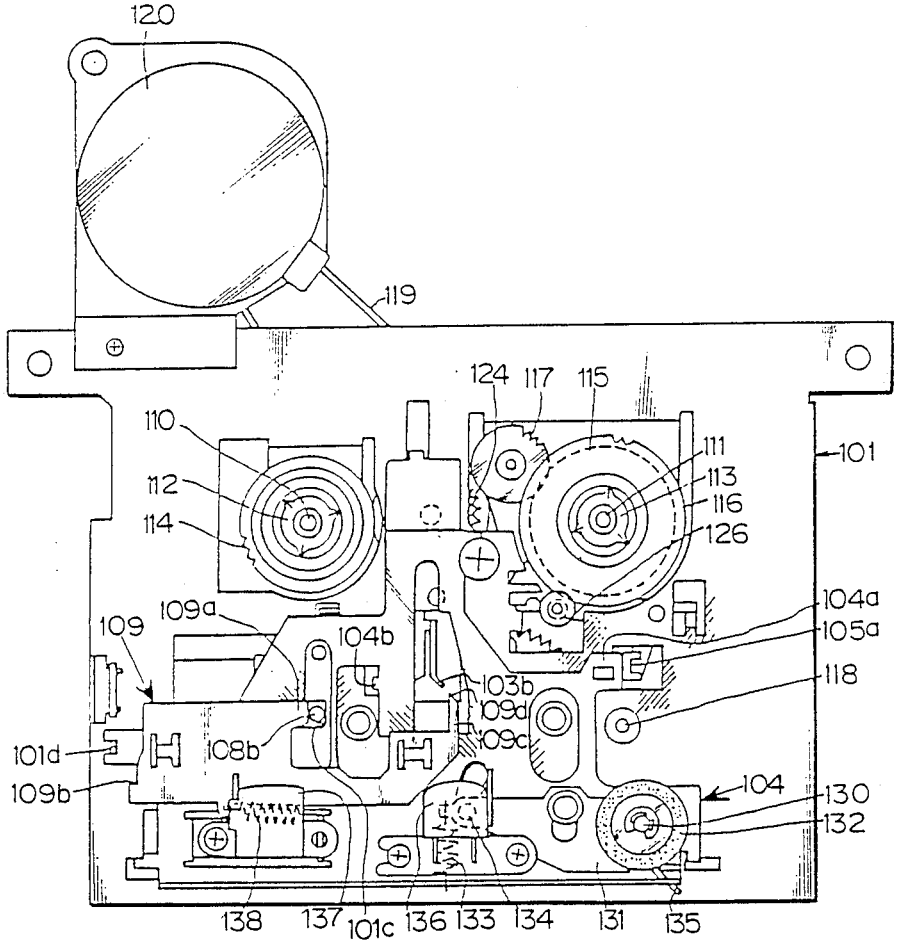
FIG. 6 is a plan view of an arrangement above the base plate of the tape recorder of FIG. 5 in the stop mode.

When the play arm assembly 105 rotates clockwise in the drawings, the play gear 126 is engageable with the gear 116 of the take-up reel base 113. However, while the projection 105a of the play arm 105 engages the control portion 104a of the head plate 103 as shown in FIGS. 5 and 6, the play gear 126 is isolated from the gear 116. The pulley 125 is connected to the pulley 102b of the flywheel 102 by the belt 121, and the play pulley 127 compressingly engages the belt 121 between the pulleys 125 and 127.

Therefore, when the flywheel 102 is rotated via the belt 119, the play pulley 127 is also rotated. Additionally, since the play pulley 127 is compressed by the tensile force of the belt 121, the play arm assembly 105 is biased clockwise in the drawings. Nevertheless, the play arm assembly 105 is normally prevented from rotating clockwise because the projection 105a engages the control portion 104a of the head plate 104.

Figure 7:
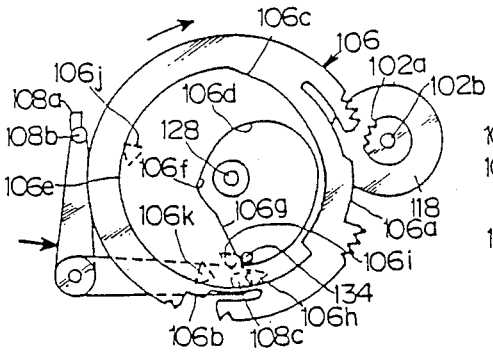
FIG. 7 is a fragmentary plan view of an assist gear shown in FIG. 5, which is in the stop mode.
Figure 8:
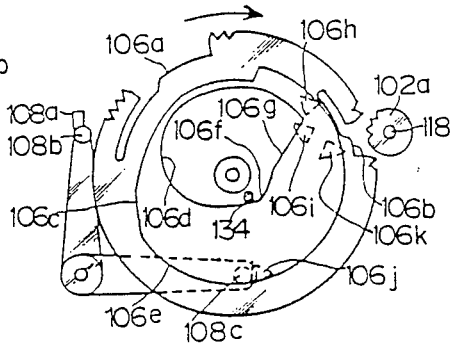
FIG. 8 is a plan view of the assist gear of FIG. 7 which is in the recording/reproducing mode.

Under the base plate 101 is rotatably provided an assist gear 106. A gear 102a formed integrally on the flywheel 102 is located close to the outer circumference of the assist gear 106. The assist gear 106 has non-toothed portions 106a–106 b as best shown in FIG. 7. The upper surface of the assist gear 106 has an up-step portion which is higher than the remainder of the upper surface. The up-step portion defines an outer circumference 106e and an inner cam contour 106d. The outer circumference 106e includes an outer cam contour 106c which confronts the downward vertical portion 103d and gradually approaches the rotation axis of the assist gear 106. The inner cam contour 106d defines an oval which is eccentric with respect to the rotation axis of the assist gear 106 and is chipped at one end thereof as defined by a substantially straight edge 106g. The straight edge 106g extends between a small-radius portion and a large-radius portion of the oval, and defines a moderate valley 106f at the junction with the small-radius portion. The assist gear 106 has four projections 106h–106i–106j–106k projecting downward from the bottom surface thereof. The projections 106h–106j–106k are located along the circumference of a common circle coaxial with the assist gear 106, and the projection 106i is located radially inward of the other three projections. The assist gear 106 is rotated clockwise by the gear 102a as will be described later. The rear end of the projection 106i is beveled so that the radially inner edge thereof is rearwardly longer than the outer edge thereof.

Under the base plate 101 is mounted a solenoid 107 having a plunger 107a. The plunger 107a has an annular groove 107b near the distal end thereof. The annular groove 107b engages a pin 108a provided at one end of one arm of a bell-crank-shaped trigger arm assembly 108. Another pin 108b which is longer than the pin 108a is provided near the pin 108a and projects above the base plate 101. The other arm of the trigger arm assembly 108 has a pin 108c formed at one end integrally therewith. The trigger arm assembly 108 is biased clockwise by a spring 129, but is prevented from rotating while the pin 108b engages a margin 101c of a relief hole of the base plate 101. When the solenoid 107 is energized and attracts the plunger 107a, the trigger arm assembly 108 is rotated counterclockwise in FIG. 5 to locate the pin 108c radially inward of the projection 106h, 106j, 106k of the assist gear 108. When the solenoid 107 is de-energized, the trigger arm assembly 108 is rotated clockwise by the resiliency of the spring 129 to bring the pin 108c ahead and locate it in the path of the projections 106h–106j–106k. The solenoid 107 is selectively switched in response to a selected operating mode of the recorder between a short time energization and a long time energization.

Above the base plate 101 is provided the head plate 104 supported by a guide means for movement slidably back and forth in FIG. 6. The right end of the head plate 104 in FIG. 6 has a pinch roller shaft 130 secured thereto. The pinch roller shaft 130 supports a bias lever 131 for pivotal in a plane parallel to the head plate 104 and also supports a pinch roller 132 pivotably. The bias lever 131 has a pin 134 at a free end thereof and is biased by a spring 133 counterclockwise in FIG. 6 for an amount of rotation limited by engagement of the pin 134 with a corner of the inner cam contour 106d defined by the large-radius portion and the straight edge 106g and fixes the assist gear 106 at a predetermined angular position. At that time, the head plate 104 is located at a pause position (a lower position in FIG. 6), and the non-toothed portion 106a is located slightly apart from the gear 102a of the flywheel 102. The bias lever 131 and head plate 104 are connected by a coil spring 135 so that they move together for a distance when the bias lever 131 is moved. The head plate 104 supports a recording/reproducing head 136 and an erasing head 137 secured thereto by an appropriate means.

The head plate 104 has a downward bent portion 104b projecting toward the drive arm 103. The bent portion 104b extends through and under the base plate 101 and normally engages the cam portion 103a of the drive arm 103 to locate same at a neutral position. On the left hand side of the head plate 104 in FIG. 6 is mounted a slide plate 109 which is supported by an appropriate guide means for slidably moving in right and left directions.

The slide plate 109 is biased by a spring 138 to the right in the drawing up to a position where a projection 109a of the slide plate 109 abuts the pin 108b of the trigger arm 108. The slide plate 109 has a step portion 109b along the left margin thereof. When the slide plate 109 is maintained at a left hand position against the spring energy and when the slide plate 109 is moved forth (upward) in FIG. 6 together with the head plate 104, the step 109b abuts a projection 101d formed on the base plate 101 to terminate the movements of the slide plate 109 and the head plate 104. The slide plate 109 has a projection 109c which extends from one end of the plate 109 toward the upward vertical portion 103b of the drive arm 103. The distal end of the projection 109c is beveled to define a slope 109d. The projection 109c is normally located on the left hand in FIG. 6 of an imaginary extension of the upward vertical portion 103b of the drive arm 103. However, when the projection 103c is moved leftward in FIG. 5 via the pin 108b of the trigger arm 108 in response to energization of the solenoid 107, the slope 109d of the projection 109c confronts the upward vertical portion 103b of the drive arm 103 and pushes same to the right when the slide plate 109 moves upwardly in FIG. 6 together with the head plate 104.

Figure 9:
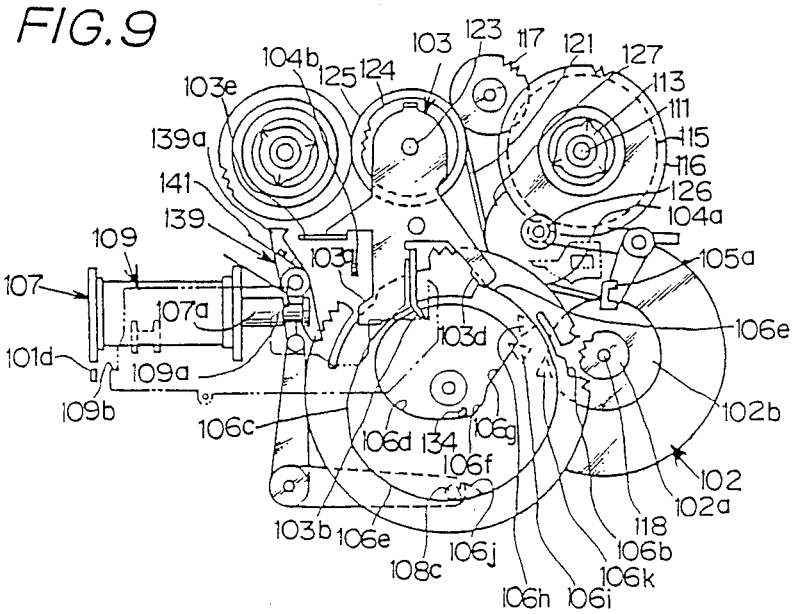
FIG. 9 is a plan view of the arrangement corresponding to that of FIG. 6 which is in the recording/reproducing mode.
Figure 10:
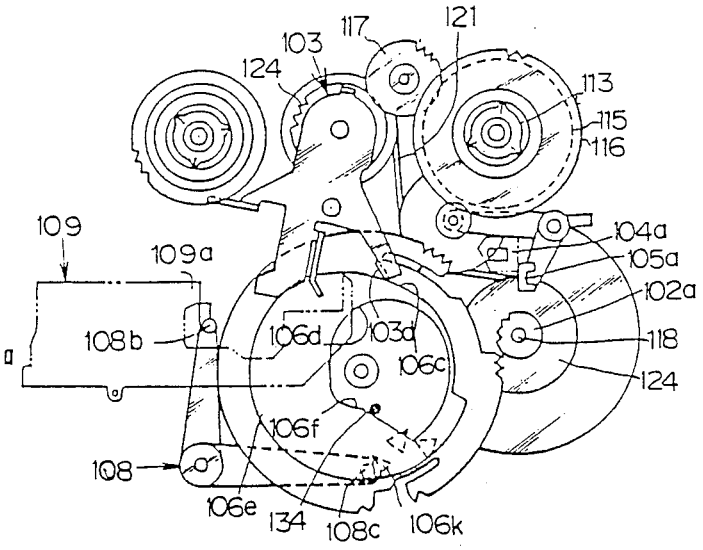
FIG. 10 is a plan view of the arrangement corresponding to that of FIG. 5 which is in the recording/reproducing mode.

As shown in FIGS. 5 and 9, a control arm 139 is pivotably supported by an axle 140 in front of the plunger 107a and is biased clockwise by a spring 141. The control arm 139 has a hook 139a for control of the upward vertical portion 103e of the drive arm 103 and has a member 139b contactable with the pin 108a of the trigger arm 108. The hook 139a engages the upward vertical portion 103e when the solenoid 107 is activated.

The embodiment of FIGS. 5 through 10 which includes the control arm 139 reliably prevents a fault that the drive gear engages the gear for the fast-forwarding mode particularly in a change from the recording/reproducing mode to the stop mode.

In conclusion, the invention system is configured to reliably bring the head plate to the stop position, recording/reproducing position or the intermediate position by selectively switching a single solenoid between the long time energization and the short time energization. Therefore, a single solenoid can control all the modes of the recorder. This contributes to a significant reduction in weight, size and cost of the recorder as compared to the prior art recorder using a plurality of solenoids for changing modes.

The embodiments of the invention in which an exclusive property or privilege is claimed are defined as follows:

1. A tape player having a plurality of operational modes, including a stop mode, a reproduction mode, a fast-forwarding mode, and a rewinding mode, said tape player comprising:

a rotatably supported supply reel base and a rotatably supported take-up reel base;

a rotatably driven driving gear;

a drive arm supported for movement between fast-forwarding and rewinding positions and being movable to a neutral position located between said fast-forwarding and rewinding positions;

biasing means for yieldably urging said drive arm toward its fast-forwarding position;

means responsive to said drive arm respectively being in said fast-forwarding and rewinding positions for effecting high-speed rotation of said take-up and supply reel bases, respectively;

a head plate supported for movement between a stop position and a reproduction position, said head plate being movable to a fast-forwarding/rewinding position located between said stop and reproduction positions;

a single operating mode changing solenoid which can be selectively energized for one of a long time interval and a short time interval;

a trigger arm supported for movement between first and second positions and being operatively coupled to said solenoid, said solenoid moving said trigger arm to said first and second positions when said solenoid is respectively de-energized and energized;

a rotatably supported assist gear having a toothed portion which can engage said driving gear and having a non-toothed portion which interrupts engagement of said driving gear and said assist gear when angularly aligned with said driving gear, said assist gear including first, second and third control portions which can engage a portion of said trigger arm when said trigger arm is respectively in its first, first and second positions and when said assist gear is respectively in first, second and third angular positions which are angularly spaced, said driving gear being angularly aligned with said non-toothed portion of said assist gear when said assist gear is in said first, second and third angular positions, engagement of said portion of said trigger arm with said first, second and third control portions of said assist gear respectively preventing rotational movement of said assist gear past its first, second and third angular positions, respectively, and engagement of said portion of said trigger arm with said first, second and third control portions being interrupted by movement of said trigger arm respectively to its second, second and first positions, said assist gear having thereon a first cam cooperable with said drive arm for respectively permitting and preventing movement of said drive arm from its neutral position to its fast-forwarding position when said assist gear is respectively in said third angular position and in angular positions spaced from said third angular position, said assist gear further having a second cam thereof; and cam follower means cooperable with said second cam for moving said head plate in response to rotation of said assist gear, said head plate respectively being positioned in said stop, said reproduction and said fast-forwarding/rewinding positions when said assist gear is respectively in said first, second and third angular positions;

wherein when said head plate is positioned at said stop position by said cam follower means due to said assist gear being positioned in said first angular position by engagement of said portion of said trigger arm and said first control portion, energization of said solenoid for said short time interval interrupts engagement of said portion of said trigger arm and said first control portion and permits said assist gear to be rotated by said driving gear to said second position in which said portion of said trigger arm engages said second control portion so that said second cam and said cam follower means position said head plate in said reproduction position and so that said first cam positions said drive arm in said neutral position, and wherein a subsequent energization of said solenoid for said long time interval interrupts the engagement of said portion of said trigger arm and said second control portion and permits said assist gear to be rotated to said third position in which said portion of said trigger arm engages said third control portion so that said second cam portion and said cam follower means position said head plate in said fast-forwarding/rewinding position and so that said first cam permits movement of said drive arm by said biasing means to said fast-forwarding position.

2. The tape recorder of claim 1, including a selection plate operatively coupled to said solenoid and supported on said head plate for movement by said solenoid to first and second positions when said solenoid is respectively de-energized and energized; wherein when said assist gear is in its first angular position, energization of said solenoid for said long time interval interrupts engagement of said engage portion of said trigger arm and said first control portion of said assist gear and permits rotation of said assist gear to its third angular position in which said portion of said trigger arm engages said third control portion while said second cam and said cam follower means move said head plate to said fast-forwarding/rewinding position, and causes said selection plate to be positioned in its second position by said solenoid so that a portion thereof engages said drive arm and moves said drive arm to its rewinding position as said head plate is moved to said fast-forwarding/rewinding position.

3. The tape recorder of claim 2, further including a base plate, said base plate and said selection plate each having engage portions which, when said selection plate is in its second position and said head plate moves away from its stop position, engage each other to prevent movement of said head plate past said fast-forwarding/rewinding position.

4. The tape player of claim 1, wherein said means for effecting high-speed rotation of said reel bases includes a drive gear rotatably supported on said drive arm and rotated by a moving endless driving belt, and includes two gears which are respectively operatively coupled to said supply and take-up reel bases and are respectively engaged by said drive gear when said drive arm is respectively in said rewinding and fast-forwarding positions, and wherein said biasing means is tension of said driving belt which drivingly engages said drive gear.

5. The tape player of claim 1, including resilient means for yieldably urging said head plate toward its stop position, said resilient means acting through said head plate and said cam follower means when said assist gear is respectively in said second and third positions to urge rotation of said assist gear respectively to said third and first angular positions.

6. The tape player of claim 1, including means responsive to movement of said trigger arm from its first position to its second position when said assist gear is in said first angular position for effecting rotation of said assist gear until said driving gear drivingly engages said assist gear.

7. A tape player having a plurality of operational modes, including a stop mode, a reproduction mode, a fast-forwarding mode, and a rewinding mode, said tape player comprising:

a rotatably driven driving gear;

a head plate supported for movement in an advance direction from a stop position to a reproduction position, said head plate being movable to a fast-forwarding/rewinding position located between said stop and reproduction positions;

a single operating mode changing solenoid which can be selectively energized for one of a long time interval and a short time interval, said solenoid being energized for said short time interval to effect a change from the stop mode to the reproduction mode, being energized for said short time interval and then for said long time interval to effect a change from the stop mode to the fast-forwarding mode, being energized for said long time interval to effect a change from the top mode to the rewinding mode, being energized for said long time interval to effect a change from the play mode to the fast-forwarding mode, and being energized for said short time interval to effect a change from the play mode to the stop mode, de-energization of said solenoid at the end of said long time interval in the fast-forwarding mode and in the rewinding mode effecting a change to the stop mode;

a trigger member supported for movement between first and second positions and being operatively coupled to said solenoid, said solenoid moving said trigger arm to said first and second positions when said solenoid is respectively de-energized and energized;

a rotatably supported assist gear having a toothed portion which can engage said driving gear so that said driving gear rotates said assist gear in a direction of rotation and having a non-toothed portion which interrupts engagement of said driving gear and said assist gear when angularly aligned with said driving gear, said assist gear including first, second and third control portions which can engage a portion of said trigger member when said trigger member is respectively in its first, first and second positions, and when said assist gear is respectively in first, second and third angular positions which are angularly spaced, said driving gear being angularly aligned with said non-toothed portion of said assist gear when said assist gear is in each of said first, second and third angular positions, engagement of said portion of said trigger member with said first, second and third control portions of said assist gear respectively preventing rotational movement of said assist gear past its first, second and third angular positions, respectively, and engagement of said portion of said trigger member with said first, second and third control portions being interrupted by movement of said trigger member respectively to its second, second and first positions;

first means responsive to rotation of said assist gear for positioning said head plate in said stop position, said reproduction position and said fast-forwarding/rewinding position when said assist gear is respectively in said first, said second and said third angular positions; and second means for effecting rotation of said assist gear in said direction of rotation away from said first, second and third angular positions thereof following interruption of the engagement of said portion of said trigger member with said first, second and third control portions, respectively.

8. The tape player of claim 7, wherein said portion of said trigger member moves approximately radially of an axis of rotation of said assit gear as said trigger member moves between its first and second positions, and wherein said first, second and third control portions are axial projections provided on said assit gear at locations spaced radially from the axis of rotation of said assist gear and spaced angularly from each other, said first and second control portions being spaced substantially the same radial distance from the axis of rotation of said assist gear, and said third control portion being spaced a smaller radial distance from the axis of rotation of said assist gear than said first and second control portions.

9. The tape player of claim 8, wherein said second means includes said third control portion having thereon an inclined surface positioned to be engaged by said portion of said trigger member as said portion of said trigger member moves out of engagement with said first control portion when said trigger member is moved from its first position to its second position while said assist gear is in its first angular position.

10. The tape player of claim 7, wherein said first means includes said assist gear having thereon a cam surface and includes cam follower means slidably engaging said cam surface and cooperable with said head plate for effecting movement of said head plate in response to rotation of said assist gear and said cam surface thereon.

11. The tape player of claim 10, wherein said cam follower means includes a bias lever which is pivotally supported on said head plate and which has thereon at a location spaced from its axis of rotation a cam follower pin which slidably engages said cam surface on said assist gear, pivotal movement of said bias lever causing said cam follower pin to move in directions approximately parallel to said advance direction, said cam follower means further including first resilient means yieldably urging movement of said cam follower pin relative to said head plate in a direction opposite said advance direction; wherein said first means includes second resilient means cooperable with said head plate for yieldably urging said head plate toward its stop position, and includes said cam surface being shaped to effect progressive movement of said cam follower pin in said advance direction as said assist gear rotates from its first angular position to its second angular position and permitting said cam follower pin to be progressively moved opposite said advance direction by said first and second resilient means as said assist gear rotates from its second angular position through its third angular position to its first angular position; and wherein said second means includes said cam surface being shaped so that forces exerted on said cam surface by said first and second resilient means through said cam follower pin when said assist gear is in its second and third angular positions yieldably urge rotation of said assist gear in said direction of rotation.

12. The tape player of claim 7, including a selection member supported on said head plate for movement between first and second positions and means for effecting movement of said selection member to its first and second positions when said solenoid is respectively de-energized and energized; said selection member having a step thereon which, as said head plate is moved away from its stop position, respectively engages and is free of engagement with a portion of a stationary base plate of the tape player when the selection plate is respectively in its second and first positions, engagement of said step and said portion of said base plate preventing movement of said head plate in said advance direction past said fast-forwarding/rewinding position.

13. The tape player of claim 12, including a drive arm supported for movement between fast-forwarding and rewinding positions and being movable to a neutral position between said fast-forwarding and rewinding positions, including means responsive to said drive arm being in its fast-forwarding and rewinding positions for effecting high speed movement of a tape, including biasing means yieldably urging said drive arm toward its fast-forwarding position, including said head plate having a portion which is engageable with said drive arm when said head plate is in said stop position for preventing said biasing means from moving said drive arm from its neutral position to its fast-forwarding position, including a cam surface on said assist gear and a cam follower on said drive arm which can slidably engage said cam surface, said cam surface and said cam follower on said drive arm preventing movement of said drive arm to its fast-forwarding position except when said assist gear is substantially in its third angular position, and including a surface on said selection member which is inclined to said advance direction and which, as said head plate is moved away from its stop position, respectively engages and is free of engagement with a portion of said drive arm when said selection member is respectively in its second and first positions, engagement of said inclined surface on said selection member with said portion of said drive arm as said head plate and selection member move in said advance direction effecting movement of said drive arm to its rewinding position.

14. The tape player of claim 7, including a play member supported for movement between first and second positions, means for yieldably urging said play member toward its second position, and a control surface provided on said head plate and slidably engaging said play member, said control surface positioning said play member in its first position when said head plate is in its stop and fast-forwarding/rewinding positions and permitting movement of said play member to its second position when said head plate is in its reproduction position, said play member having thereon a rotatably driven gear which respectively engages and is free of engagement with a gear on a rotatably supported reel base when said play member is respectively in its second and first positions.

*15. A tape player having a plurality of operational modes, including a stop mode, a reproduction mode, a fast-forwarding mode, and a rewinding mode, said tape player comprising:*

*a rotatably driven driving gear;*

*a head plate supported for movement in an advance direction from a stop position to a reproduction position, said head plate being movable to a fast-forwarding/rewinding position located between said stop and reproduction positions;*

*a trigger member supported for movement between first and second positions;*

*a rotatably supported assist gear having a toothed portion which can engage said driving gear so that said driving gear rotates said assist gear in a direction of rotation and having a non-toothed portion which interrupts engagement of said driving gear and said assist gear when angularly aligned with said driving gear, said assist gear including first, second and third control portions, wherein when said assist gear is respectively in first, second and third angular positions which are angularly spaced, movement of said trigger member effects movement of a portion thereof between positions engaging and spaced from said first, second and third control portions, respectively, said driving gear being angularly aligned with said non-toothed portion of said assist gear when said assist gear is in each of said first, second and third angular positions, engagement of said portion of said trigger member with said first, second and third control portions of said assist gear respectively preventing rotational movement of said assist gear past its first, second and third angular positions, respectively.*

*first means responsive to rotation of said assist gear for positioning said head plate in said stop position, said reproduction position and said fast-forwarding-/rewinding position when said assist gear is respectively in said first, said second and said third angular positions;*

*second means for effecting rotation of said assist gear in said direction of rotation away from said first, second and third angular positions thereof following interruption of the engagement of said portion of said trigger member with said first, second and third control portions, respectively; and*

*a single operating mode changing solenoid which is operatively coupled to said trigger member and can be selectively energized and de-energized in order to effect movement of said trigger member between said two positions thereof, said solenoid controlling movement of said trigger member so that said portion of said trigger member moves out of engagement with said first control portion and then into engagement with said second control portion following rotation of said assist gear to effect a change from the stop mode to the reproduction mode, moves out of engagement with said first control portion and then into engagement with said third control portion following rotation of said assist gear to effect a change from the stop mode to the fast-forwarding mode, moves out of engagement with said first control portion and then into engagement with said third control portion following rotation of said assist gear to effect a change from the stop mode to the rewinding mode, moves out of engagement with said second control portion and then into engagement with said third control portion following rotation of said assist gear to effect a change from the reproduction mode to the fast-forwarding mode, moves out of engagement with said second control portion and then into engagement with said*

*first control portion following rotation of said assist gear to effect a change from the reproduction mode to the stop mode, and moves out of engagement with said third control portion and then into engagement with said first control portion following rotation of said assist gear to effect a change from one of the fast-forwarding mode and the rewinding mode to the stop mode.*

*16. The tape player of claim 15, wherein said portion of said trigger member moves approximately radially of an axis of rotation of said assist gear as said trigger member moves between its first and second positions, and wherein said first, second and third control portions are axial projections provided on said assist gear at locations spaced radially from the axis of rotation of said assist gear and spaced angularly from each other.*

*17. The tape player of claim 16, wherein said second means includes said assist gear having thereon an inclined surface positioned to be engaged by said portion of said trigger member as said portion of said trigger member moves out of engagement with said first control portion when said assist gear is in its first angular position.*

*18. The tape player of claim 15, wherein said first means includes said assist gear having thereon a cam surface and includes cam follower means slidably engaging said cam surface and cooperable with said head plate for effecting movement of said head plate in response to rotation of said assist gear and said cam surface thereon.*

*19. The tape player of claim 18, wherein said cam follower means includes a bias lever which is pivotally supported on said head plate and which has thereon at a location spaced from its axis of rotation a cam follower pin which slidably engages said cam surface on said assist gear, pivotal movement of said bias lever causing said cam follower pin to move in directions approximately parallel to said advance direction, said cam follower means further including first resilient means yieldably urging movement of said cam follower pin relative to said head plate in a direction opposite said advance direction; wherein said first means includes second resilient means cooperable with said head plate for yieldably urging said head plate toward its stop position, and includes said cam surface being shaped to effect progressive movement of said cam follower pin in said advance direction as said assist gear rotates from its first angular position to its second angular position and permitting said cam follower pin to be progressively moved opposite said advance direction by said first and second resilient means as said assist gear rotates from its second angular position through its third angular position to its first angular position; and wherein said second means includes said cam surface being shaped so that forces exerted on said cam surface by said first and second resilient means through said cam follower pin when said assist gear is in its second and third angular positions yieldably urge rotation of said assist gear in said direction of rotation.*

*20. The tape player of claim 15, including a selection member supported on said head plate for movement between first and second positions and means for effecting movement of said selection member between its positions when said solenoid is respectively de-energized and energized; including a drive arm supported for movement between fast-forwarding and rewinding positions and being movable to a neutral position between said fast-forwarding and rewinding positions; including means responsive to said drive arm being in its fast-forwarding and rewinding positions for effecting high speed movement of a tape; including biasing means yieldably urging said drive arm toward its fast-forwarding position; including said head plate having a portion which is engageable with said drive arm when said head plate is in said stop position for preventing said biasing means from moving said drive arm from its neutral position to its fast-forwarding position; including a cam surface on said assist gear and a cam follower on said drive arm which can slidably engage said cam surface, said cam surface and said cam follower on said drive arm respectively preventing and permitting movement of said drive arm to its fast-forwarding position when said assist gear is substantially in its second and third angular positions; and including a surface on said selection member which, as said head plate is moved away from its stop position, respectively engages and is free of engagement with a portion of said drive arm when said selection member is respectively in its second and first positions, engagement of said surface on said selection member with said portion of said drive arm as said head plate and selection member move in said advance direction effecting movement of said drive arm to its rewinding position.*

*21. The tape player of claim 15, including a play member supported for movement between first and second positions, means for yieldably urging said play member toward its second position, and a control surface provided on said head plate and slidably engageable with said play member, said control surface positioning said play member in its first position when said head plate is in its stop and fast-forwarding/rewinding positions and permitting movement of said play member to its second position when said head plate is in its reproduction position, said play member having thereon a rotatably driven gear which respectively engages and is free of engagement with a gear on a rotatably supported reel base when said play member is respectively in its second and first positions.*

*22. A tape player having a plurality of operational modes, including a stop mode, a reproduction mode, and a high speed mode, said tape player comprising:*

*a trigger member supported for movement between first and second positions;*

*a rotatably supported assist member rotatable in a direction of rotation and having first, second and third control portions, wherein when said assist member is respectively in first, second and third angular positions which are angularly spaced, movement of said trigger member effects movement of a portion thereof between positions engaging and spaced from said first, second and third control portions, respectively, engagement of said portion of said trigger member with said first, second and third control portions of said assist member respectively preventing rotational movement of said assist member past its first, second and third angular positions, respectively;*

*means for effecting rotation of said assist member in said direction of rotation away from said first, second and third angular positions thereof following interruption of the engagement of said portion of said trigger member with said first, second and third control portions, respectively;*

*means responsive to said assist member being in said first, second and third angular positions for respectively implementing said stop mode, reproduction mode and high speed mode, including means for maintaining a tape motionless in said stop mode, for effecting lengthwise movement thereof at a first speed in said reproduction mode, and for effecting lengthwise movement thereof at a second speed substantially greater than said first speed in said high speed mode; and*

*a single operating mode changing solenoid which is operatively coupled to said trigger member and can be selectively energized and de-energized in order to effect movement of said trigger member between said two positions thereof, said solenoid controlling movement of said trigger member so that said portion of said trigger member moves out of engagement with a respective one of said first, second and third control portions and then into engagement with another of said control portions following rotation of said assist member to effect a change respectively from said stop mode, said reproduction mode and said high speed mode to a different said mode.*

*23. The tape player of claim 22, wherein said portion of said trigger member moves approximately radially of an axis of rotation of said assist member as said trigger member moves between its first and second positions, and wherein said first, second and third control portions are axial projections provided on said assist member at locations spaced radially from the axis of rotation of said assist member and spaced angularly from each other.*

*24. The tape player of claim 23, wherein said means for effecting rotation of said assist member includes said assist member having thereon an inclined surface positioned to be engaged by said portion of said trigger member as said portion of said trigger member moves out of engagement with said first control portion when said assist member is in its first angular position.*

*25. The tape player of claim 22, including a head plate supported for movement in an advance direction from a stop position to a reproduction position through a high speed position, including said assist member having thereon a cam surface and including cam follower means slidably engaging said cam surface and cooperable with said head plate for effecting movement of said head plate in response to rotation of said assist member and said cam surface thereon.*

*26. The tape player of claim 25, wherein said cam follower means includes a bias lever which is pivotally supported on said head plate and which has thereon at a location spaced from its axis of rotation a cam follower pin which slidably engages said cam surface on said assist member, pivotal movement of said bias lever causing said cam follower pin to move in directions approximately parallel to said advance direction, said cam follower means further including first resilient means yieldably urging movement of said cam follower pin relative to said head plate in a direction opposite said advance direction; including second resilient means cooperable with said head plate for yieldably urging said head plate toward its stop position, and including said cam surface being shaped to effect progressive movement of said cam follower pin in said advance direction as said assist member rotates from its first angular position to its second angular position and permitting said cam follower pin to be progressively moved opposite said advance direction by said first and second resilient means as said assist member rotates from its second angular position through its third angular position to its first angular position; and wherein said means for effecting rotation of said assist member includes said cam surface being shaped so that forces exerted on said cam surface by said first and second resilient means through said cam follower pin when said assist member is in its second and third angular positions yieldably urge rotation of said assist member in said direction of rotation.*

*27. The tape player of claim 22, including a head plate supported for movement in an advance direction from a stop position through a high speed position to a reproduction position; including means for effecting movement of said head plate in response to rotation of said assist member; and wherein said means for effecting lengthwise tape movement at said second speed includes a selection member supported on said head plate for movement between first and second positions and means for effecting movement of said selection member between its positions when said solenoid is respectively de-energized and energized, a drive arm supported for movement between fast-forwarding and rewinding positions and being movable to a neutral position between said fast-forwarding and rewinding positions, means responsive to said drive arm being in its fast-forwarding and rewinding positions for effecting high speed movement of a tape, biasing means yieldably urging said drive arm toward its fast-forwarding position, said head plate having a portion which is engageable with said drive arm when said head plate is in said stop position for preventing said biasing means from moving said drive arm from its neutral position to its fast-forwarding position, a cam surface on said assist member and a cam follower on said drive arm which can slidably engage said cam surface, said cam surface and said cam follower on said drive arm respectively preventing and permitting movement of said drive arm to its fast-forwarding position when said assist member is substantially in its second and third angular positions, and a surface on said selection member which, as said head plate is moved away from its stop position, respectively engages and is free of engagement with a portion of said drive arm when said selection member is respectively in its second and first positions, engagement of said surface on said selection member with said portion of said drive arm as said head plate and selection member move in said advance direction effecting movement of said drive arm to its rewinding position.*

*28. The tape player of claim 22, including a head plate supported for movement in an advance direction from a stop position through a high speed position to a reproduction position; including means for effecting movement of said head plate in response to rotation of said assist member; and wherein said means for effecting lengthwise tape movement at said first speed includes a play member supported for movement between first and second positions, means for yieldably urging said play member toward its second position, and a control surface provided on said head plate and slidably engageable with said play member, said control surface positioning said play member in its first position when said head plate is in its stop and high speed positions and permitting movement of said play member to its second position when said head plate is in its reproduction position, said play member having thereon a rotatably driven gear which respectively engages and is free of engagement with a gear on a rotatably supported reel base when said play member is respectively in its second and first positions.*

* * * * *

UNITED STATES PATENT AND TRADEMARK OFFICE

CERTIFICATE OF CORRECTION

PATENT NO. : Re. 33 483

DATED : December 11, 1990

INVENTOR(S) : Masao KAMIJO

It is certified that error appears in the above-identified patent and that said Letters Patent is hereby corrected as shown below:

Column 11, line 65; replace "thereof" with ---thereon---.

Column 13, line 33; replace "top" with ---stop---.

Column 16, line 31; replace "respectively." with ---respectively;---.

Signed and Sealed this

Thirteenth Day of October, 1992

*Attest:*

DOUGLAS B. COMER

*Attesting Officer*

*Acting Commissioner of Patents and Trademarks*